United States Patent [19]
Stievenart et al.

[11] 3,959,654
[45] May 25, 1975

[54] DISPENSER FOR SHEET LIKE MATERIAL

[75] Inventors: Emile Frans Stievenart, Hoboken; Hugo Frans Deconinck, Deurne-Zuid; Willy Gabriel Ceuppens, Borgerhout, all of Belgium

[73] Assignee: AGFA-GEVAERT N.V., Mortsel, Belgium

[22] Filed: Jan. 29, 1974

[21] Appl. No.: 437,701

[30] Foreign Application Priority Data
Jan. 30, 1973  United Kingdom............... 4656/73

[52] U.S. Cl. ............................................... 250/468
[51] Int. Cl.² ............................................ G11B 1/00
[58] Field of Search .................... 250/468, 469, 420

[56] References Cited
UNITED STATES PATENTS

| | | | |
|---|---|---|---|
| 3,075,080 | 1/1963 | Sano | 250/468 |
| 3,105,903 | 10/1963 | Sano et al. | 250/468 |
| 3,111,585 | 11/1963 | Sano et al. | 250/468 |
| 3,150,263 | 9/1964 | Catlin | 250/468 |
| 3,191,031 | 6/1965 | Sano et al. | 250/468 |
| 3,374,351 | 3/1968 | Sano et al. | 250/468 |
| 3,634,687 | 1/1972 | Somerset et al. | 250/468 |
| 3,652,853 | 3/1972 | Williner et al. | 250/468 |

*Primary Examiner*—Alfred E. Smith
*Assistant Examiner*—B. C. Anderson
*Attorney, Agent, or Firm*—William J. Daniel

[57] ABSTRACT

A mechanism is presented by means of which the uppermost sheet from a stack of sheets may be dispensed without excessive friction of the sheets against each other.

It may advantageously be incorporated in a dispenser for radiographic film which may be installed in daylight conditions. In order to perform a loading cycle automatically, auxiliary expedients are described, particularly concerning the opening and closing of the radiographic cassette.

8 Claims, 17 Drawing Figures

DISPENSER FOR SHEET LIKE MATERIAL

This invention is related with sheet dispensing devices, and in particular with sheet dispensers as used in daylight loading systems suited for medical radiography.

In medical radiography, a great deal of the exposures is carried out with the help of light-tightly closed cassettes, which are provided at the inner side of the cover and/or the bottom with a fluorescent screen, capable of urging firmly against the sheet of radiographic film contained in the cassette and emitting radiation to which the film is sensitive.

The trend towards automation and rationalization in the field of radiography has been the cause that systems have been devised, which enabled the unloading of the radiographic cassettes in daylight, so that a processing machine no longer ought to be placed in a darkroom. A cassette and an apparatus suited for use as daylight unloading system are described in the Belgian Pat. Specification 792,707 filed Dec. 14, 1972 by Agfa-Gevaert N.V.

The task of a department for radiography may further be rationalized when the radiologist disposes of a radiographic film dispenser, capable of loading a cassette in day-light, so that no longer a member of the staff has to proceed to the step of re-loading the cassette in a darkroom.

An apparatus for day-light loading of radiographic cassettes has recently been marketed. It consists of an apparatus which dispenses radiographic film materials which had previously been provided with an indentation in the proximity of one of the corners of the film. The films are piled in alternating position, so that e.g. the odd numbered sheets of the pile have their indentation at the right hand side and the even numbered ones have theirs at the left hand side.

The dispensing mechanism makes use of two fingers, the position of which corresponding with that of the two rows of indentations of the films in the pile. A selecting mechanism takes care in that the finger which contacts the lower edge will be displaced in downward direction, whereas the one being capable to pass through an indentation will exert a slight pressure on the rest of the film pack. In the meantime a slight pressure is applied on the upper edge and lateral edges of the film pack. Simultaneously a pressure plate is urged at the backside of the pack and all the sheets minus one are pressed together. The absence of pressure in the uppermost sheet tends the latter to be partly flexed and consequently to pass over the finger. Release of the pressure makes this sheet free to fall into an opened cassette.

Apart from the necessity to provide the films with indentations and the alternating piling of said films, the apparatus which executes the aforementioned steps is rather voluminous.

It is therefore an object of the invention to provide a method and an apparatus by means of which normal, rectangular sheets may be dispensed from a pile of such sheets.

Another object of the invention is to provide an apparatus which is relatively small and easy to operate.

A further object of the invention is to provide an apparatus showing supplementary advantages.

According to the present invention there is provided an apparatus for dispensing sheets one by one from the top of a pile, such apparatus comprising sheet gripping means which is movable towards and against the exposed top surface of the upper sheet of a said pile for taking hold of such sheet at at least one zone adjacent one edge thereof, and means for imparting to such gripping means while it keeps hold of such sheet, first a turning movement to cause a flexure of the held sheet whereby the said one edge thereof is lifted away from the underlying sheet, and subsequently a movement which bodily displaces the said sheet off the pile with the said one edge of the upper sheet leading so that it can be taken hold of by a take-up mechanism, e.g., a pair of transporting rollers.

The sheet gripping means may comprise one or more suction-type holders. There may for example be one such holder for taking hold of each sheet at a central region along one margin thereof, i.e., the margin which is to be raised by flexure of the sheet. Alternatively there may be more than one such holder, the two or more holders being spaced along such margin and operating in unison.

The complete dispensing apparatus preferably comprises a pair of take-up rollers located so that the sheet gripping means causes the leading edge of a sheet held thereby to be inserted into the nip of such rollers in consequence of the bodily movement imparted to such sheet by such sheet gripping means.

The said apparatus may also comprise a container for holding a pile of sheets to be dispensed by the operation of such sheet gripping means.

According to a preferred feature of the invention, there is at least one said sheet-gripping means in the form of a pivotally supported suction holder having a convexly curved cam face at one side thereof and after the suction holder has been pressed against the upper surface of the top of a pile, a relative motion is imparted to said cam face and an abutment member. The pressure of such member against the curved cam face causes locking motion of the suction holder to bring about the required lifting motion of the sheet edge away from the underlying sheet. The suction holder preferably comprises a flexible mouth enabling it to conform to the upper surface of the top sheet of a pile even if that upper surface is not truly flat.

In the experimental prototype of an apparatus according to the invention, there is at least one sucker-cup which is able to perform a series of horizontal, vertical and rotational movements. The rotational movement is carried out immediately after the sucker-cup has contacted the upper face of the sheet.

As the leading edge of the uppermost sheet is raised during bending of the sheet, air flows under said sheet and above the underlying one, so that separation of the two sheets becomes extremely easy. Indeed, when piling a number of film sheets, it may happen that the latter more or less firmly adhere to each other as a consequence of a partial vacuum between adjacent sheets or of the presence of electrostatic charges.

Although in the preferred embodiment, described hereinafter, reference will be made to a dispenser for sheets of radiographic film, it is to be understood that every sheet-like material showing an even and not too porous surface may be dispensed advantageously with an apparatus according to the invention. By way of example, the apparatus may also be incorporated in an automatic copying apparatus for dispensing sheets of photocopy paper without departing from the scope and spirit of the invention.

In order to clearly understand the nature of the invention, a preferred embodiment is described hereinafter with reference to the accompanying drawing in which.

Figure 1:
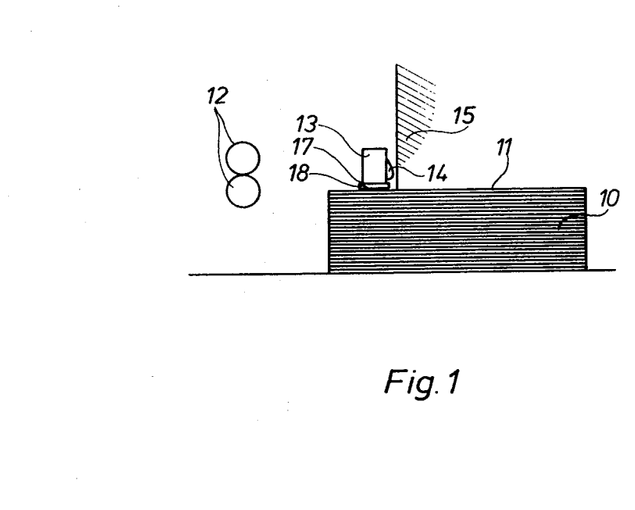
FIG. 1 is a view of a dispensing mechanism according to the invention.

As can be seen in FIG. 1, the principal aim of the invention is to take the uppermost sheet 11 from a pile of sheets 10, and to bring it to the feed rollers 12 by means of a sucker-cup 13. In order to make this possible, considering the fact that the piled sheets may firmly adhere to each other due to the phenomena described hereinbefore, the leading edge of sheet 11 is bent so as to permit air to flow under it.

Figure 2:
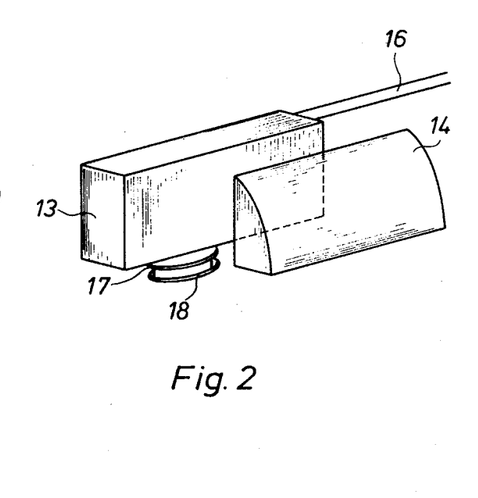
FIG. 2 shows a detail of the sucking device.

To this end a cam 14 is provided, which through the intermediary of the abutment member 15 is capable of performing the necessary steps, detailed hereinafter. FIG. 2 gives a view of the sucker-cup and the cam, so that it may be seen that the cup 13 is in the form of a solid block provided with a suction pipe 16, the sucking device itself extending from the bottom of the block and being composed of two parts, shown more in detail in FIG. 4. It is obvious that a plurality of sucker-cups may be provided when the width of the sheet to be dispensed becomes relatively large. In that case an abutment member 15 is provided at each end of a support extending over one dimension of the pile and carrying the said plurality of sucker-cups.

In FIG. 3 are illustrated the different steps necessary for lifting the uppermost sheet of a pile 10. FIG. 3a corresponds with the stand-by position during which the sucker-cup 13 is at rest somewhat above the pile 10. The two constituting parts, a housing 17 and a piston 18, are still separated from each other.

Figure 3A:
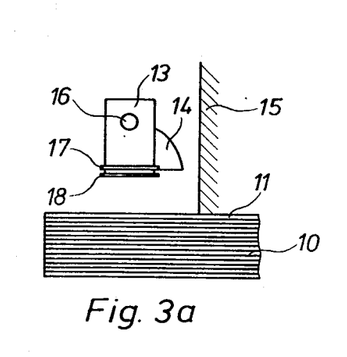
FIGS. 3a to 3f present the different steps of the dispensing mechanism in dispensing a sheet.
Figure 3B:
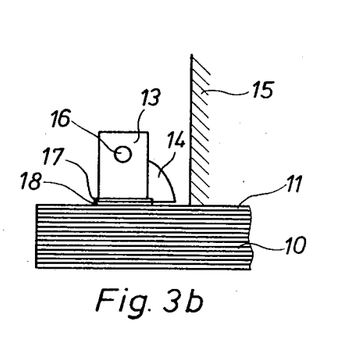

In FIG. 3b the sucker-cup 13 has already moved in downward position in order to contact sheet 11 which must be lifted from the pile. Piston 18 slides into the housing 17 and vacuum means (not shown) are energized in order to evacuate the suction pipe 16, causing a firm adhesion between the sheet 11 and the piston 18.

Figure 3C:
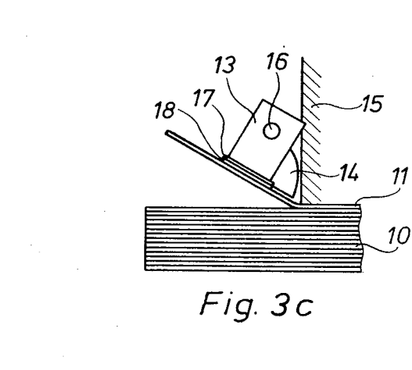
Figure 3D:
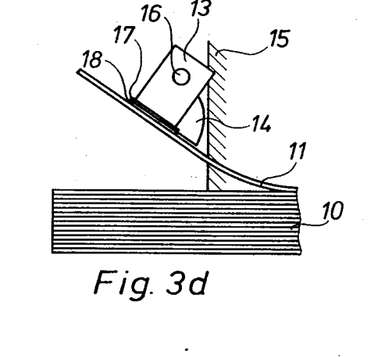

In FIG. 3c the edge of sheet 11 is bent by a horizontal movement of the sucker-cup 13, in that the cam 14 is arrested by the abutment member 15, causing a partial rotation of the cam and the sucker-cup 13 itself due to the curved side of the cam 14 which starts "riding" along the member 15. Because of the vacuum created in the inside of the sucker-cup 13, the leading edge of the uppermost sheet 11 also participates in the rotation brought about by the action of the cam 14. As air may flow in the space between the uppermost sheet and the underlying one, the sheet 11 may be further lifted upwards without difficulty. This is done by the vertical movement of the sucker-cup 13 while the cam 14 remains in sliding contact with the abutment member 15. The sheet 11 starts to move bodily relative to the underlying sheet only after that the rotary movement of the sucker-cup has been performed.

Figure 3E:
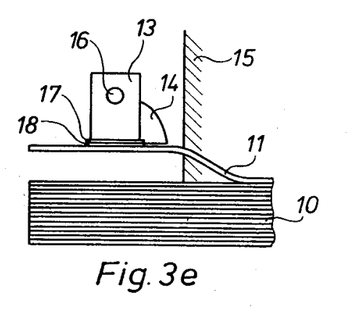
Figure 3F:
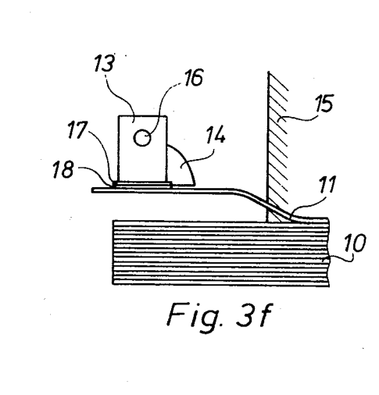

Once the sucker-cup has been raised over a sufficient height, the cup starts moving away from the guide 15 and moves towards the feed rollers 12 (represented in FIG. 1). It will be seen that on leaving contact with the abutment member 15 the cup swings back into horizontal position about its pivot. This is further illustrated in FIGS. 3e and 3f. Upon contacting the nip of the rollers 12 by the leading edge of the sheet, the vacuum source (not shown) is cut-off. The mechanism capable of imparting the composite cyclic movement to the sucker-cup 13 is illustrated further in the course of this description.

Figure 4:
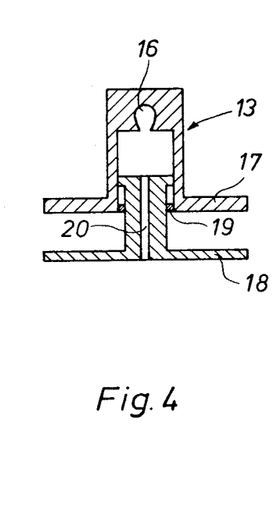
FIG. 4 is a sectional view of a sucker-cup.

A sectional view of the sucker-cup 13 is represented in FIG. 4. As can be seen, this device consists of the housing 17 and the piston 18, the latter being capable of sliding into the former. A spring ring 19 is provided at the outlet of the housing 17 in order to prevent the piston 18 from sliding off the housing. A plurality of sucker-cups built-in into one solid block becomes extremely advantageous when relatively large sheets are to be dispensed.

Figure 5:
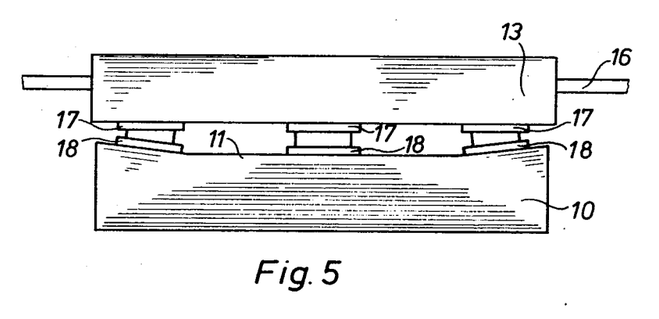
FIG. 5 shows a combined suction mechanism in which a plurality of sucker-cups is used, and which is capable of adapting itself to the form of a pile.

The working of the sucker-cup 13 is as follows: when the latter contacts a sheet, the piston 18 slides upwards until it is arrested by the ring forming the bottom of the housing 17. When applying a partial vacuum through the conduit 16, the inside of the housing and the bore 20 in the interior of the piston 18 become evacuated when the opening of the hole 20 is masked by some even and nonporous surface, as it is e.g. the case with a sheet of radiographic film. The vacuum within the interior of the sucker-cup causes the sheet to be dispensed to adhere firmly to the ring of piston 18, so that the sucker-cup may impart a series of movements to that sheet without risk for the latter to fall off. In order to improve the keeping of the sheet against the sucking device, the ring provided at the bottom of piston 18 is made of a deformable material, preferably rubber. By the fact that the piston 18 may be somewhat tilted, the apparatus is even able to lift the uppermost sheet from a pile when the latter is not completely flat. This is illustrated in FIG. 5, where a sucking device, comprising three sucker-cups built-in into one solid block, is represented be it in an enlarged way.

Figure 6:
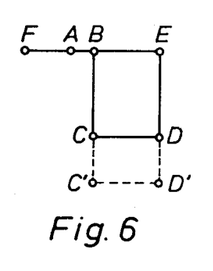
FIG. 6 shows the movement of the cups during a dispensing action.

In FIG. 6 are repeated schematically the paths to be covered by the sucker-cup in order to perform one complete dispensing cycle. Starting from the rest position indicated by A, the sucker-cup first slightly moves to B and then lowers to position C where the uppermost sheet is contacted. The horizontal movement towards D causes the rotation of the cup, because the "riding" starts and a strict horizontal movement is impossible. Then the sheet is lifted to position E and dispensing is completed in F where the sheet is sufficiently close to the rollers for further feeding it into the device wherein the sheet is to be placed. The vertical distance between the paths CD and C'D' corresponds with the height of the pile (see FIG. 8).

In order to catch the uppermost and the bottom sheets of a pile and in absence of a kind of platform, which automatically keeps the level of the uppermost sheet constant, as it is for example the case with printing apparatus, the sucker-cup must be able to perform a vertical movement of varying length. The mechanisms capable of performing these movements are represented in FIGS. 7 and 8.

Figure 7:
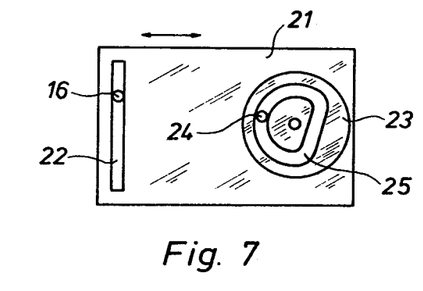
FIG. 7 shows the mechanism for the horizontal movement of the cups.
Figure 8:
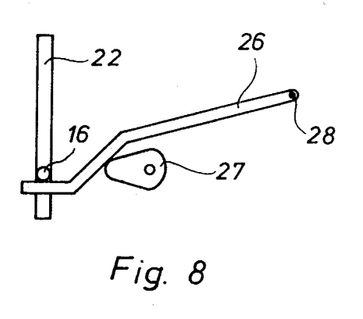
FIG. 8 shows the mechanism for the vertical movement of the cups.

FIG. 7 is a schematic representation of the mechanism for the horizontal movement of the sucker-cup. To this end a slide 21, provided with a slot 22 in which one end of the suction pipe 16 may slide and housed in adequate bearings (not represented), is located at either side of the apparatus. By means of a motor (not shown) a disk 23 in which a guide 25 is provided rotates and imparts a horizontal movement to a pin 24 fixedly joined to the slide 21. As a consequence, thereof the slide 21 will perform a horizontal movement too, whilst carrying along the suction pipe 16. The length of the slot 22 corresponds with the maximum height of the pile.

This horizontal movement occurs sequentially with a vertical movement. One of the mechanisms used for this purpose is represented in FIG. 8. Preferably, these mechanisms are mounted in close proximity to the mechanisms for the horizontal movement. The vertical movement is performed by a lever 26 which bears the suction pipe 16, sliding in the slot 22, and pivots around a pin 28. The lever is lifted by means of a cam 27 driven by motor means (not shown).

Both motors responsible for the movement of the sucker-cup are sequentially energized so that the different steps, represented in FIG. 6, may be carried out in the right order. The stepwise starting and stopping of the motors may be controlled by microswitches or analogous devices known in the art.

Figure 9:
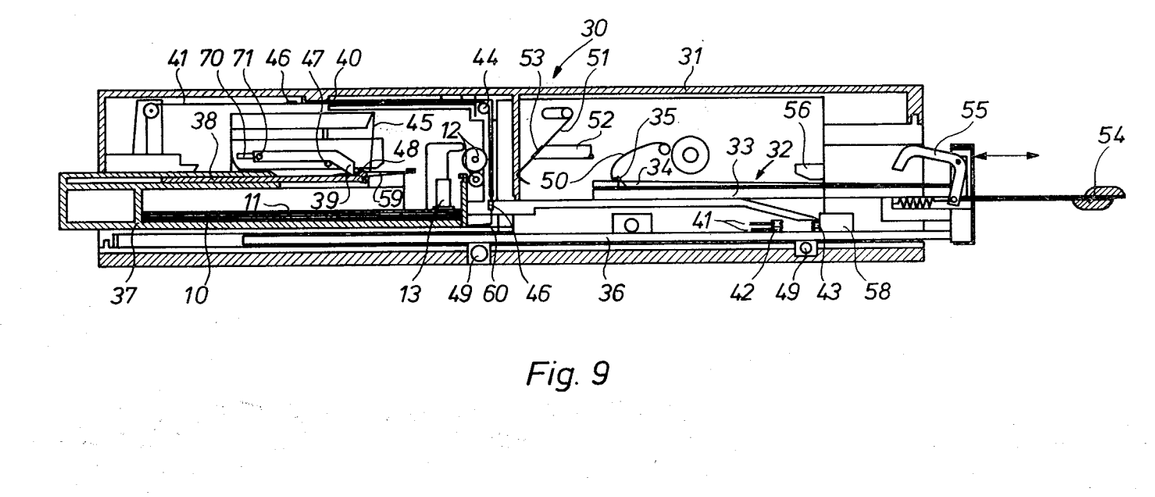
FIG. 9 is a lateral sectional view of a dispenser for daylight loading of radiographic cassettes embodying the invention and FIG. 10 shows a detail of FIG. 9.

The mechanism for picking up a sheet-like material from a pile and conveying it to another device or station may be advantageously incorporated into a daylight cassette loader for dispensing radiographic films into a cassette. FIG. 9 is an illustration of such a device.

The experimental prototype of a radiographic film sheet dispenser is composed of three main parts: a holder 37 capable of being light-tightly forwarded into a housing 31 and which is opened when it has entered sufficiently far into said housing, the dispensing mechanism, which has been described so far and a movable carriage 36 capable of receiving a cassette to be loaded and to carry the latter into and out of the apparatus.

The holder 37 is double-walled at its upper side in order to house a slidable lid 38 in the space defined by said double walls. The edge of the lid light-tightly closes towards the front of the holder 37 in order to prevent the entry of light which would cause unwanted exposure of the pile of radiographic films 10 when introducing the latter into the apparatus. The lid 38 is driven into its housing by the spring 45 which urges against a projection 48 located at the edge of the cover. In this way the holder 37 is ready for operation as it is opened over half its length.

In order to avoid exposure when still non-exposed films are contained in the holder and the latter must be withdrawn for some purpose or other, for example, when a series of exposures must be carried out which require a radiographic film of another sensitivity, automatic closing of the holder while it is still in the apparatus is necessary. To this end, a pivotable lever 39, capable of sliding in slot 70 and pivotable around the axis 71, is provided which slides behind the projection 48 until the holder 37 is light-tightly closed again. By further moving the holder 37 out of the apparatus the slanting side of the pivoting lever 39 is lifted upwards by the roller 47, the latter staying immobile, so that the holder becomes completely free.

The cassette 32, comprising a bottom 33, a cover 34 and levers 35 (one at either side of the cassette) is introduced into the apparatus by placing it on a carriage 36, which passes over the rollers 49 into the apparatus. Although the dispenser 30 is suited for feeding sheets into most existing cassette models, a cassette according to the Belgian Pat. Specification 792,707 as mentioned above may be used advantageously.

Once the cassette 32 is introduced into the apparatus, the levers 35 firstly contact a rabbet 50, which consists of a strip of relatively resilient material, transversally extending over the full width of the carriage 36. The rabbet 50 which is capable of sliding into the space between the bottom 33 and the projection of the lever 35 lifts the latter upon further introduction of the cassette. This causes the cassette to become unlocked, so that the cover 34 is somewhat lifted out of the device. At a given moment, upon further movement of the cassette into the apparatus, the levers 35 will completely collapse, causing the cover to come out of the apparatus. Then the movement continues until a second rabbet 51 is contacted which normally is at the height of the cover of the already partly opened cassette. The cover 34 is caught and further lifted to a height which is sufficiently great for easily introducing a sheet 11 of radiographic film by means of the dispensing mechanism described hereinbefore. Lifting of cover 34 occurs by partial rotation of rabbet 51. In order to arrest the movement of the cassette, a stop 52 capable of witholding the movement of rabbet 51 is provided which stops the movement of the cassette by abutment against the lid 53, fixed to the said stop.

Between the holder 37 and the cassette 32, the daylight loading apparatus being in closed position, is provided the dispensing mechanism as described hereinbefore. The sucker-cup 13 is presented as being in contact with the upper sheet 11 of a pile of radiographic film sheets 10. The feed rollers 12 (here represented as having different diameters) may guide and even partly project said sheet into the cassette 32.

Once the cassette 32 has been loaded, that is to say, when the sheet of radiographic film has completely passed through the nip of the feed rollers 12 and is introduced into the cassette, the latter is taken out of the apparatus again.

In order to do this safely and to prevent any trace of light from entering into the cassette, the latter must be closed before leaving the day-light loading apparatus. Firstly, by actuating the dual grip 54 the lever 55 urges against the cover 34, and in this way prevents shifting of the cassette on the carriage 36. When further moving the carriage 36 backwards, rabbet 50 reverses the levers 35 so that the latter return into their normal position again, in this way light-tightly closing the cassette. Occasionally, the cam 56 may press on the cover 34 too, if the latter would not have been completely disappeared into the bottomframe. When the cassette is out of the apparatus, it is locked by pushing the levers 35 in their locking position.

It will be appreciated that during the steps of introduction and withdrawal of the cassette care must be taken in order to prevent ambient light to enter into the holder 37 as the slidable cover 38 thereof is opened once the holder has been introduced in the apparatus.

Figure 10:
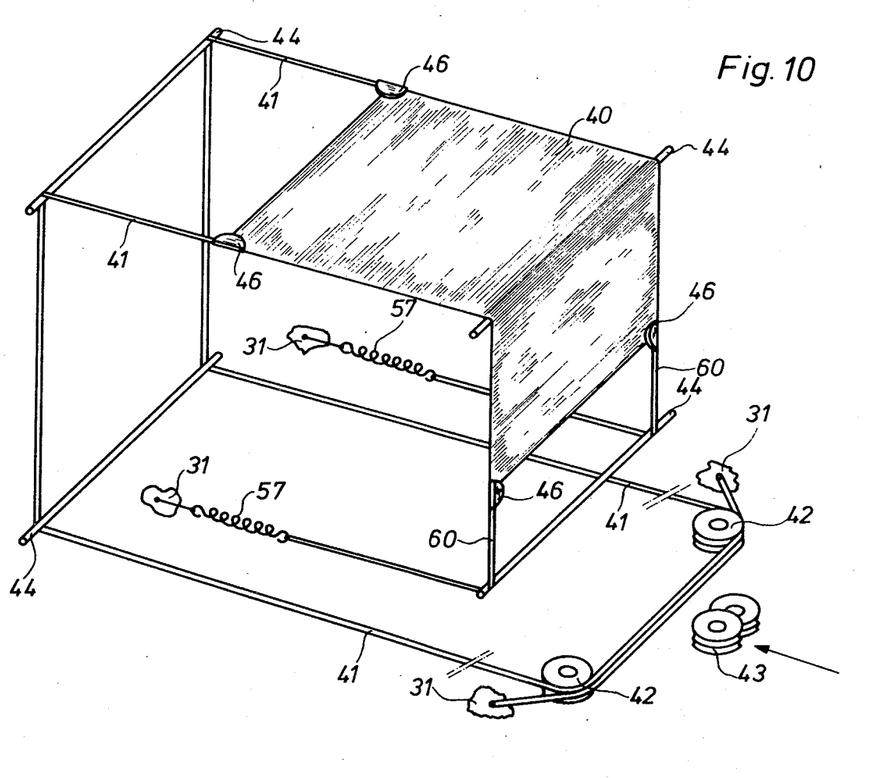

Therefore, a curtain 40 is provided over the holder 37, which covers the opened part of the latter and which uncovers said part only after the cassette has attained a position in which the sensitive material can no more be affected in the holder. The curtain 40 is made of a flexible, light-tight material such as rubber or an opaque high polymer material. An isometric view of the protecting mechanism is shown in FIG. 10. The curtain 40 is tensioned between two pairs of strings 41 and 60, one pair connected at each edge by means of clips 46. The whole set is guided on four rotatable shafts 44. In the position as shown, the vertical part of the curtain 40 is sufficiently long in order to mask the opening in the container completely (see FIG. 9). The extremities of the strings 60 attached to the lower edge of the curtain are each fixedly joined to a spring 57, which themselves are connected to a point of the housing 31 of the apparatus.

The set of strings 41, which start at the other edge of the curtain follow a path reaching till the front side of the dispenser, somewhat after the opening through which the cassette 32 is introduced into the apparatus. There, they are guided over two pairs of guide rollers 42 and have their extremities connected to the frame 31 too, so forming a pair of horizontal strips which extend yieldingly transversally over the opening of the apparatus. The mechanism to lift the curtain upon the entering of a cassette is as follows: at the bottom of the carriage 36 a support 58 is provided, which is partly hollow and in which two pairs of analogous guide rollers 43 are housed (FIG. 9). When said guide rollers 43 contact the two horizontal portions of the string 41, they are intercepted and parallelly displaced towards the middle of the apparatus. This movement is taken over by the whole system, causing a lifting of the curtain and an elongation of the springs 57. When the dispensing action is over and the loaded cassette is conveyed out of the apparatus again, the elasticity of said springs 57 makes the curtain return to its initial position. Instead of the rollers 43 any means capable of performing the step of seizing the strings, for example a couple of hooks, may be used.

Figures 11, 12:
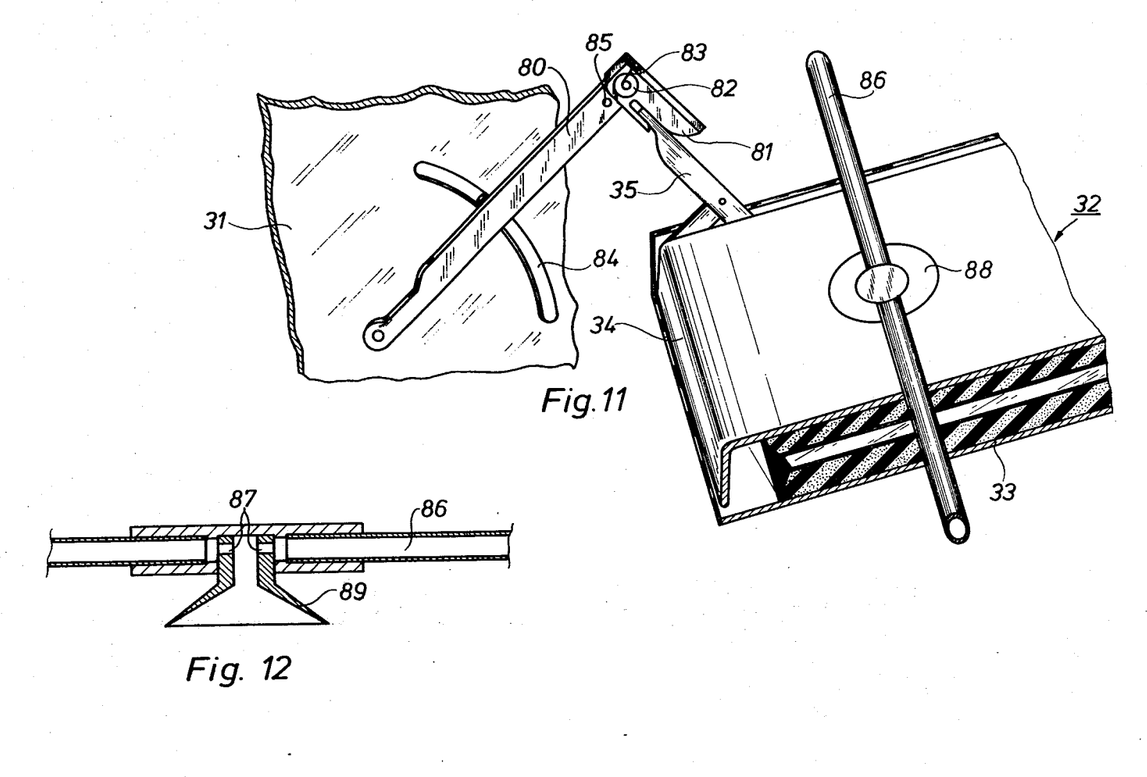
FIG. 11 shows another mechanism for opening the cassette.
FIG. 12 illustrates a detail of FIG. 11.

Another device for opening a locked cassette 32 when introducing the latter into the day-light loading apparatus is represented in FIG. 11.

Such device comprises a pivotable lever 80 which is capable of performing a partial rotation over an angle determined by the length of the slot 84. At the other end of said lever 80 an arm 81 is provided which is also capable to pivot around an axis, formed by the bush 82. A spring 83, mounted inside the bush 82 and urging against the arm 81, pushes the latter in a position so that it is arrested by the pawl 85. When the lever 80 is at rest, the whole lever system (levers 80 and 81) takes a more or less horizontal position.

Lever 81 is provided with a slot, in which the extremity of lever 35, which upon collapsing unlocks the locking mechanism of the cassette 32, may be introduced. Upon moving the locked cassette towards the pivoting point of lever 80, the latter starts to rotate, while the extremity of lever 35 is maintained in the slot of lever 81. At a given moment lever 35 collapses and unlocks the cover 34 of the cassette 32. When this step occurs, a suction device comprising a sucker-cup 88 or 89 and a vacuum conduit 86 (see also FIG. 12) is moved towards the cover 34 of the cassette. When the sucker-cup 89 contacts the cover 34, vacuum is applied through openings 87 and the sucker-cup 88, or if necessary a plurality of it, is capable of lifting the cover 34 and to bring the cassette in this way in a sufficiently open condition in order to introduce a film sheet in the opening between the cover 34 and the bottom part 33.

When closing the cassette 32, the reverse action occurs. Vacuum is released, so that the cover 34 is loosening. When the cassette is taken out of the day-light loading apparatus, the levers 80 and 81 are brought in their initial position again; lever 81 still holding the extremity of lever 35. When the cassette is sufficiently far out of the apparatus, the extremity is released and a locked cassette 32 is at the disposal of the operator.

As may be concluded from the foregoing description, a new and valuable device has been devised which greatly reduces the volume and the complexity of prior art devices. The convenience of the apparatus may be enhanced by the provision of supplementary expedients.

In the holder 37 itself may be provided, if desired the movable arm of a microswitch which closes when the last sheet has been taken out of the holder, causing the ignition or extinction of a small lamp on the front panel or the excitation of a buzzer. Another expedient may consist in the provision of means for controlling the opening of the holder 37, for example a microswitch or a terminal 59, which has a member actuated by the cover 38 and which in this way may indicate whether the holder is opened or closed, by energizing a small lamp or a buzzer.

The cassette to be loaded and the holder 30 must not necessarily be placed in the same plane, as may be concluded from FIG. 9. By providing e.g. a guide shell or a plurality of roller pairs, the sheet may be conveyed to a cassette loading station lying above or under the plane of the holder.

The parts, necessary to energize the dispenser mechanism and to regulate the sequential cycle, are controlled by a push-button. They are however not described as such parts may be of any type generally known in the art.

We claim:

1. A daylight film loader for a normally closed radiographic film cassette adapted to be opened for the loading of fresh film therein, which comprises:
   1. a generally light-tight housing,
   2. a magazine section in said housing for holding a supply of fresh film to be loaded,
   3. a loading section in said housing in generally adjacent relation to said supply section, said loading section being adapted to be opened for the introduction therein of a cassette into opened loading position and be closed when the cassette is in loading position,
   4. dispensing means operative in said magazine section to deliver film from said magazine section into said cassette,
   5. light shielding means disposed generally between said two housing sections for movement between an operative closed position isolating said magazine section from said loading section and an open position in which the two sections are in communication, and
   6. operating means for said shielding means effective in response to the arrival and departure of said cassette to and from its loading position to move said shielding means to and from its operative closed position.

2. The cassette loader of claim 1 wherein said loading section includes a cassette carriage disposed for movement to and from a projected exteriorly accessible position to the placement of a cassette therein from and to a retracted position with the cassette in loading position and at which said loading section is closed.

3. The cassette loader of claim 2 in which said carriage has mounted thereon actuating means for operating said shielding means operating means as said carriage reaches its retracted position.

4. The cassette loader of claim 1 wherein said operating means includes biasing means returning said shielding means to its closed position when said cassette departs from its loading position.

5. The daylight film loader as in claim 1 wherein said supply section has an opening at an end thereof opposite said light shielding means for the introduction therein of a magazine containing a stack of sheets of fresh film, said magazine comprising a generally shallow container having side walls and front and back end walls upstanding from a planar bottom wall on which said stack of sheets rests, and a top wall normally closing said container against entry of light, at least a front portion of said top wall being supported for relative sliding movement in the plane of said top wall to provide an opening adjacent the front container end for removal of the film sheets therefrom, said slidable top wall portion having a projection extending therefrom adjacent its front edge, and said loading section having detent means operable to engage said projection to slidably open and close said wall portion when said magazine is introduced into and removed from said loading section through said end opening therein.

6. The daylight film loader as in claim 5 wherein said projection comprises an exteriorly projecting lip and said detent means comprises opposed front and back detent surfaces engagable with opposite sides of said lip upon movement of said magazine container in opposite directions, said back detent surfaces being movable out of the path of said lip to permit passage of the lip therebeyond.

7. The daylight film loader as in claim 6 including inclined cam surfaces associated with said back detent surfaces for engagement by said lip to displace said back detent surfaces for passage of said lip therebeyond.

8. The daylight film loader as in claim 5 wherein said container has a slotted rear top wall section fixed to said side and back walls for telescopingly receiving said slidable front top wall section.

* * * * *